United States Patent
Lee et al.

(10) Patent No.: US 8,505,080 B2
(45) Date of Patent: Aug. 6, 2013

(54) METHOD FOR GENERATING CROSS-SITE SCRIPTING ATTACK

(75) Inventors: Hahn-Ming Lee, New Taipei (TW); Yi-Hsun Wang, New Taipei (TW); Kuo-Ping Wu, Taipei (TW); Ching-Hao Mao, Taipei (TW); Jerome Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 13/298,295

(22) Filed: Nov. 17, 2011

(65) Prior Publication Data
US 2013/0055400 A1    Feb. 28, 2013

(30) Foreign Application Priority Data
Aug. 26, 2011 (TW) .............................. 100130715 A

(51) Int. Cl.
*G06F 11/00* (2006.01)
(52) U.S. Cl.
USPC .............................................. 726/5; 713/188

(58) Field of Classification Search
None
See application file for complete search history.

(56) References Cited

U.S. PATENT DOCUMENTS

| | | | |
|---|---|---|---|
| 7,933,946 B2 * | 4/2011 | Livshits et al. | 709/200 |
| 8,225,402 B1 * | 7/2012 | Averbuch et al. | 726/23 |
| 2004/0260754 A1 * | 12/2004 | Olson et al. | 709/200 |
| 2009/0119769 A1 * | 5/2009 | Ross et al. | 726/13 |
| 2011/0167493 A1 * | 7/2011 | Song et al. | 726/23 |

FOREIGN PATENT DOCUMENTS
TW    200825836    6/2008

* cited by examiner

*Primary Examiner* — Fikremariam A Yalew
(74) *Attorney, Agent, or Firm* — Jianq Chyun IP Office

(57) ABSTRACT

A method for generating a cross-site scripting attack is provided. An attack string sample is analyzed for obtaining a token sequence. A string word corresponding to each token is used to replace the token for generating a cross-site scripting attack string. Accordingly, a large number of cross-site scripting attacks are generated automatically, so as to execute a penetration test for a website.

7 Claims, 4 Drawing Sheets

METHOD FOR GENERATING CROSS-SITE SCRIPTING ATTACK

CROSS-REFERENCE TO RELATED APPLICATION

This application claims the priority benefit of Taiwan application serial no. 100130715, filed on Aug. 26, 2011. The entirety of the above-mentioned patent application is hereby incorporated by reference herein and made a part of this specification.

BACKGROUND OF THE INVENTION

1. Field of the Invention

The disclosure relates to a method for generating a network attack, and more particularly to a method for generating a cross-site scripting attack.

2. Description of Related Art

A cross-site scripting attack is a website vulnerability attack method which gradually becomes more common in recent years. In 2007, the cross-site scripting attack already becomes one of the top 10 website security vulnerability attack methods. In a web application, a cross-site attack can bypass access control thereof to acquire elevated privileges. These attacks are all caused by incomplete or inaccurate filter functions contained in the web application. Nowadays, even a programmer or a security expert also uses an automatic test tool to find cross-site flaws. Such a tool lacks a variation mechanism to assist the discovery of potential cross-site flaws. A website may allow a user to input a string and also operation of a database system on a server. Therefore, a hacker is capable of inserting a web and a scripting language in fields for inputting characters or character strings on a website to make other users download and execute malicious program codes while viewing a web page or redirect the users to a malicious website, so the users are under network attacks.

Generally a website establishes detection rules for protection against cross-site scripting attacks. However, attack string samples are used to attempt to penetrate a website to test tolerance of a website against cross-site scripting attacks. As the detection rules might be incomplete or be avoided, the number of attack string samples is limited and website vulnerabilities are not necessarily accurately covered, a penetration test with a large amount of automatic attacks is hard to be performed.

SUMMARY OF THE INVENTION

A method for generating a cross-site scripting attack is introduced herein, so a large amount of varied cross-site scripting attacks for use in execution of a penetration test for a website are generated automatically.

The disclosure provides a method for generating a cross-site scripting attack, which includes the following steps. First, a number of attack string samples are received. Each attack string sample includes a number of string words. Next, the attack string samples are respectively analyzed to obtain a number of first token sequences. Each first token sequence includes a number of tokens and each token corresponds to at least one string word. Subsequently, according to the string words corresponding to the tokens and the first token sequences, a number of cross-site scripting attack strings are generated. Further, the cross-site scripting attack strings are output.

In one embodiment of the disclosure, in the step of respectively analyzing the attack string samples to obtain the first token sequences, based on a cross-site scripting language syntax corresponding to the string words, the attack string samples are analyzed to obtain the first token sequences.

In one embodiment of the disclosure, in the step of generating the cross-site scripting attack strings, according to the first token sequences, a structure model is established to generate a number of second token sequences by using the tokens according to the structure model. Also, the string words corresponding to the tokens are substituted into the second token sequences to generate a number of cross-site scripting attack strings.

In one embodiment of the disclosure, the second token sequences are randomly generated according to the structure model.

In one embodiment of the disclosure, the structure model is established according to the Bayes' theorem, Markov Chain (MC) or Hidden Markov Model (HMM). In addition, the structure model is converted through probability and automata technologies. The structure model is represented by a directed graph to decide an order of the tokens in the second token sequences.

In one embodiment of the disclosure, the string words corresponding to the tokens are randomly substituted into the second token sequences according to the cross-site scripting language syntax.

Based on the above, in the method for generating a cross-site scripting attack of the disclosure, the attack string samples are converted into token sequences and the string words corresponding to the tokens are used to replace the tokens to generate the cross-site scripting attack strings. Therefore, the disclosure may generate new unprecedented cross-site scripting attacks to assist the current cross-site flaw detection technology and enhance the capability of testing unknown flaws of a website.

In order to make the features and advantages of the disclosure more clear, the embodiments are illustrated below in detail with reference to the accompanying drawings.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

First Embodiment

Figure 1:
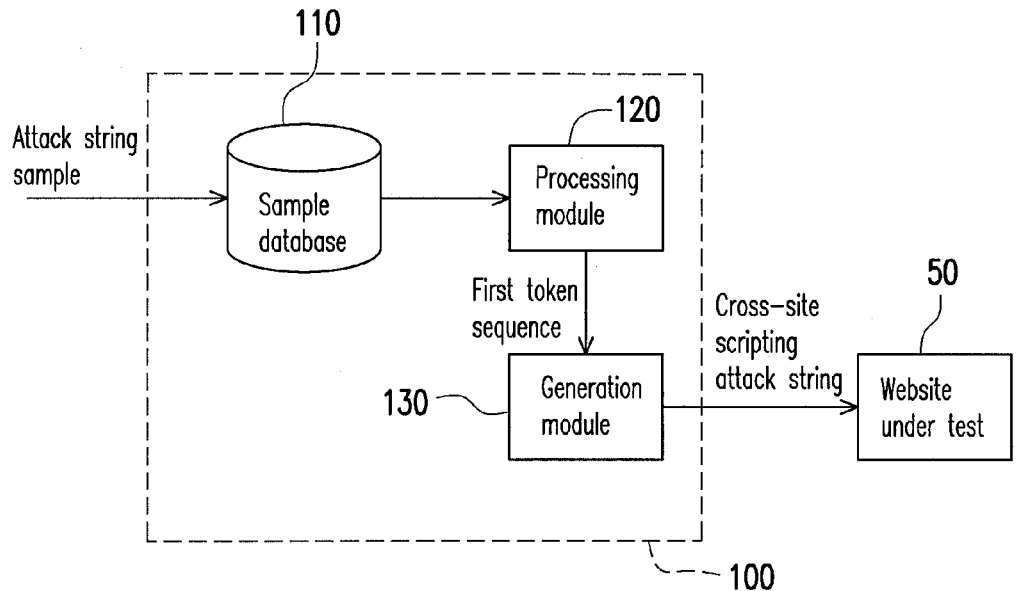
FIG. 1 is a schematic view of a system for generating a cross-site scripting attack according to a first embodiment of the disclosure.

FIG. 1 is a schematic view of a system for generating a cross-site scripting attack according to the first embodiment of the disclosure. Referring to FIG. 1, a system for generating a cross-site scripting attack 100 is used for receiving attack string samples. After a series of processing on the attack string samples, cross-site scripting attack strings are outputted to a website under test 50. Here, the system for generating a cross-site scripting attack 100 mainly includes a sample database 110, a processing module 120 and a generation module 130. The processing module 120 is coupled to the sample database 110 while the generation module 130 is coupled to the processing module 120.

In this embodiment, the system for generating a cross-site scripting attack 100 may be disposed in an electronic device having a central processing unit (CPU) and a storage unit. The sample database 110 is disposed in the storage unit and the central processing unit operates the processing module 120 and the generation module 130. The processing module 120 and the generation module 130 may be respective independent chips or program codes written with a program language. However, it is only exemplary rather than limiting the implementation means thereof.

The sample database 110 is used for saving a number of attack string samples. Each attack string sample is formed of a number of string words. The attack string samples may be collected from network public resources, instances in books and documents, eavesdropped traffic of a honeypot, and website access records. The processing module 120 is used for reading the attack string samples from the sample database 110 and analyzing each attack string sample to obtain a number of first token sequences. That is to say, one first token sequence is obtained from one attack string sample. The generation module 130 is used for generating a number of cross-site scripting attack strings according to the number of first token sequences obtained by the processing module 120 and outputting the cross-site scripting attack strings to the website under test 50. The steps of the method for generating a cross-site scripting attack are illustrated below with reference to the system for generating a cross-site scripting attack 100 in FIG. 1.

Figure 2:
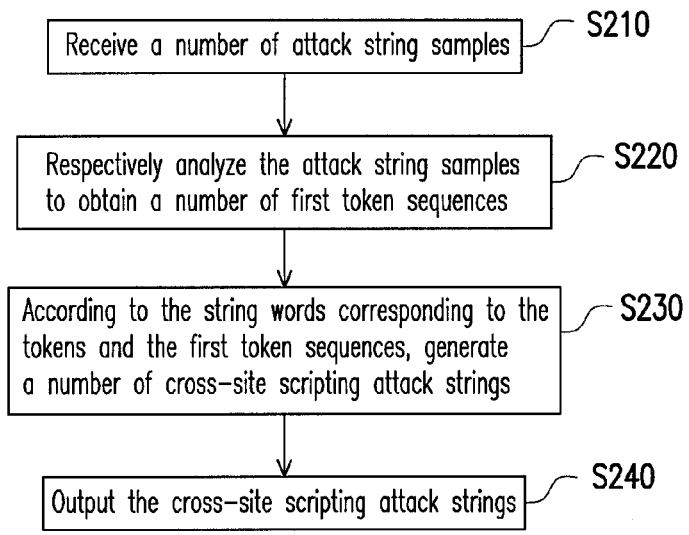
FIG. 2 is a flow chart of a method for generating a cross-site scripting attack according to the first embodiment of the disclosure.

FIG. 2 is a flow chart of a method for generating a cross-site scripting attack according to the first embodiment of the disclosure. Referring to FIG. 1 and FIG. 2 at the same time, in Step S210, the processing module 120 reads a number of attack string samples from the sample database 110. That is, the attack string samples are used as input values of the processing module 120. Next, in Step S220, the processing module 120 respectively analyzes the attack string samples to obtain a number of first token sequences.

Here, each first token sequence includes a number of tokens and each token corresponds to at least one string word. Specifically, upon acquiring one of the attack string samples, the processing module 120 first decodes the attack string sample. The decoding action may contain conversion of word internal codes and characters, redundant character removal and corresponding actions of special and escape symbols, and conversion of characters, so as to reproduce the general website scripting language words. Subsequently, according to cross-site scripting language syntax, the decoded attack string sample is broken to convert the string word into a series of corresponding tokens. Here, the series of tokens are referred to as first token sequences. Therefore, the output of the processing module 120 is the first token sequences.

Subsequently, in Step S230, the generation module 130 generates a number of cross-site scripting attack strings according to the string words corresponding to the tokens and the first token sequences. As shown in Step S240, after the cross-site scripting attack strings are generated, the generation module 130 outputs the cross-site scripting attack strings to the website under test 50. Therefore, the cross-site scripting attack strings are used to test the endurance of the website under test 50 against cross-site scripting attacks, so as to find out website vulnerabilities of the website under test 50.

Second Embodiment

Figure 3:
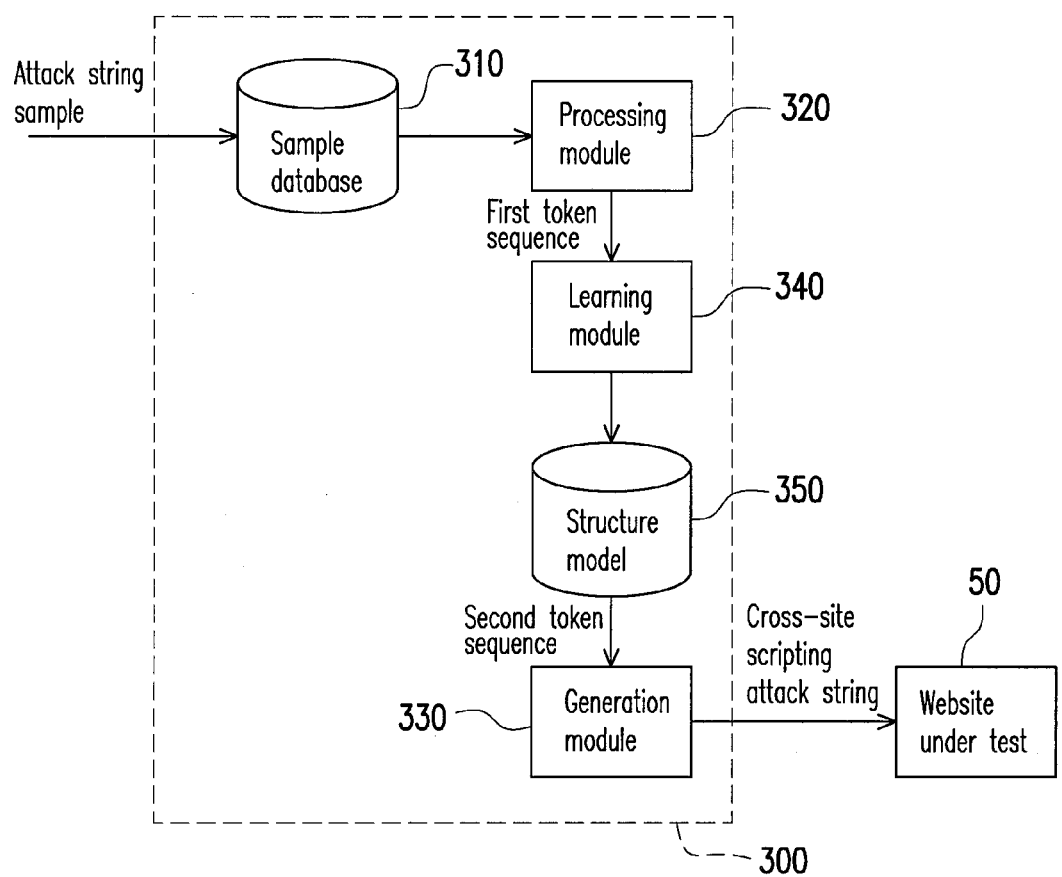
FIG. 3 is a schematic view of a system for generating a cross-site scripting attack according to a second embodiment of the disclosure.

FIG. 3 is a schematic view of a system for generating a cross-site scripting attack according to the second embodiment of the disclosure. Referring to FIG. 3, a system for generating a cross-site scripting attack 300 includes a sample database 310, a processing module 320, a generation module 330, a learning module 340 and a structure model 350. The sample database 310, the processing module 320 and the generation module 330 in this embodiment respectively have similar or same functions as the sample database 110, the processing module 120 and the generation module 130 in the first embodiment, which are no longer described here in detail. That is to say, compared with the system for generating a cross-site scripting attack 100 in the first embodiment, the system for generating a cross-site scripting attack 300 in this embodiment further includes the learning module 340 and the structure model 350.

The learning module 340 is coupled to the processing module 320 and may establish a structure model 350 according to the first token sequences to reflect the relationship between the first token sequences and the tokens through a statistical method. For example, the learning module 340 may learn and establish a structure of the first token sequences by using a probability model to establish the structure model 350. Here, the probability model may be Bayes' theorem, MC or HMM.

Figure 4:
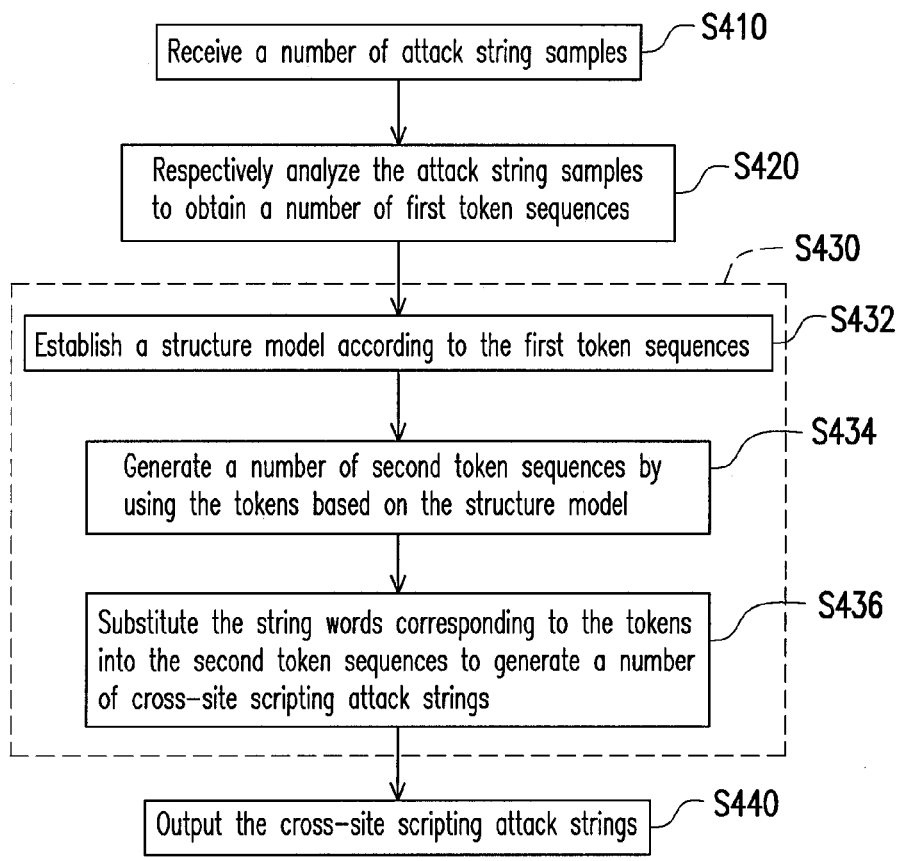
FIG. 4 is a flow chart of a method for generating a cross-site scripting attack according to the second embodiment of the disclosure.

The steps of the method for generating a cross-site scripting attack are illustrated below with reference to the system for generating a cross-site scripting attack 300 in FIG. 3. FIG. 4 is a flow chart of the method for generating a cross-site scripting attack according to the second embodiment of the disclosure. Referring to FIG. 3 and FIG. 4 at the same time, in Step S410, the processing module 320 receives a number of attack string samples from the sample database 310. Each attack string sample is formed of a number of string words. Five examples of the attack string sample are provided as follows:

(1) '"';alert(String.fromCharCode(88,83,83))//`;alert(String.fromCharCode(88,83,83))//";alert(String.fromCharCode(88,83,83))//`;alert(String.fromCharCode(88,83,83))/ /-></SCRIPT>">'><SCRIPT>alert(String.fromCharCode(88,83,83))</SCRIPT>=&fg"

(2) alert(String.fromCharCode(88,83,83))

(3) <DIV STYLE="background-image:n0075n0072n006 Cn0028'n006an0061n0076n0061n0073n0063n0072n0069n0070n0074n003an0061n006 cn0065n0072n0074n0028.1027n0058.1053n0053n0027n0029'n0029">

(4) <SCRIPT>a=/XSS/alert(a.source)</SCRIPT>"

(5) <A HREF="http://6	6.000146.0x7.147/">XSS</A>

Next, in Step S420, the processing module 320 respectively analyzes the attack string samples to obtain a number of first token sequences. Here, each first token sequence is formed of a number of tokens and each token corresponds to at least one of the string words. For example, the processing module 320 may first break the attack string samples and categorize the broken string words respectively (for example, six categories: "Start tag," "Attribute," "The Value of Attribute," "Plain text," "End tag" and "Comment"), and replace the string words with the corresponding tokens.

Subsequently, in Step S430, the learning module 340 and the generation module 330 generate a number of cross-site scripting attack strings according to the string words corresponding to the tokens and the first token sequences. In this embodiment, Step S430 includes three sub-steps, that is, Steps S432, S434 and S436.

In Step S432, the learning module 340 establishes the structure model 350 according to the first token sequences. Specifically, the first token sequences may be used as input values of the learning module 340. The learning module 340 takes statistics of the correlation between the tokens by using a probability model (for example, the Bayes' theorem, MC or HMM) according to the frequencies and order of the tokens appearing in the first token sequences and generates a probabilistic grammar of corresponding token orders. The probabilistic grammar may then be converted into the structure model 350 through the automata technology. Here, the nodes in the structure model 350 represent the statuses of the tokens in the first token sequences. That is, after respective structure models of the first token sequences are established, the common statuses thereof may be merged so the respective structure models of the first token sequences are merged into an integrated structure model 350 to be served as a comprehensive structure of the cross-site scripting attacks learned from the samples.

Figure 5:
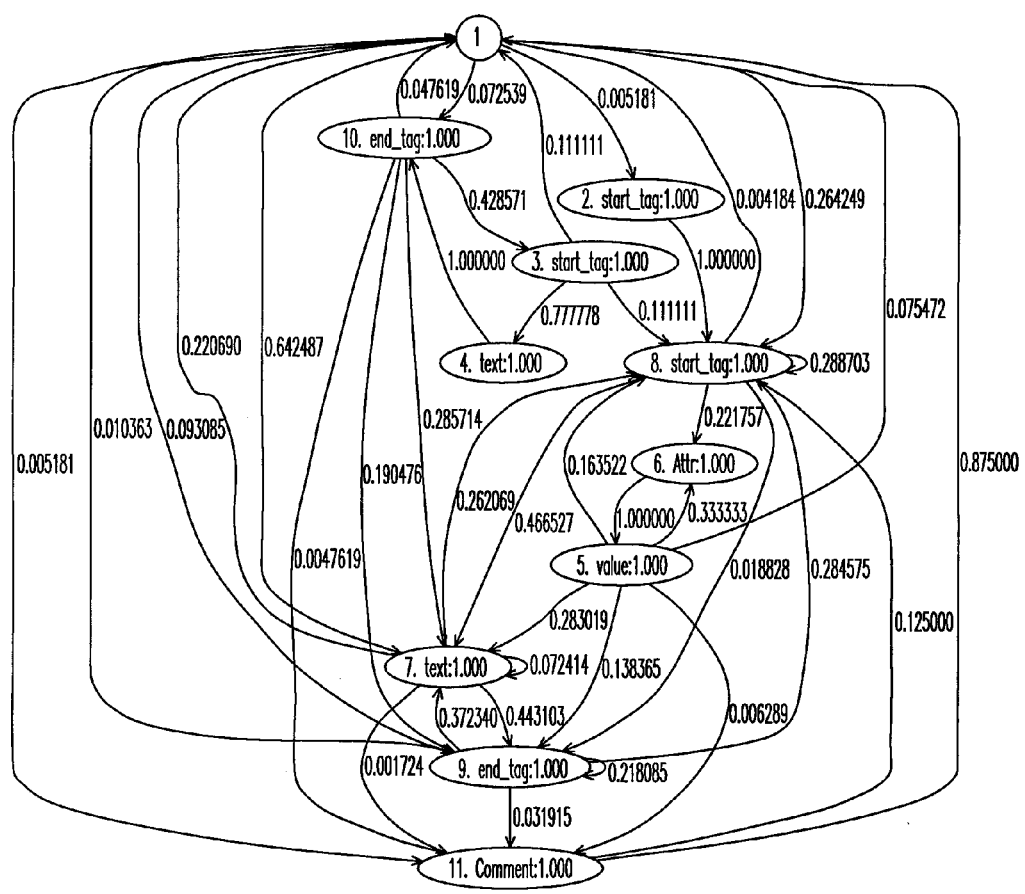
FIG. 5 is a schematic view of a structure model according to the second embodiment of the disclosure.

For example, FIG. 5 is a schematic view of a structure model according to the second embodiment of the disclosure. The structure model 350 is established based on the Bayes' theorem, MC or HMM, which may present the statuses of the tokens through the nodes. A probability value is marked at a connecting side and serves as a representation of the structure model. In this embodiment, the structure model 350 includes 11 nodes, which is only exemplary for illustration and does not limit the disclosure.

Referring to FIG. 5, a directed edge of the structure model 350 is a direction of status conversion. The number at the directed edge is a probability value of the status conversion. One of the first token sequences traverses all nodes in FIG. 5 from Node 1 in a direction of the directed edge and returns to Node 1 for an end. With the first token sequences converted from the attack string samples, the learning module 340 may automatically learn possible sequence combinations of the tokens and establish the structure model 350 accordingly.

Next, referring to FIG. 4 again, in Step S434, the learning module 340 can use the structure model 350 to generate a number of second token sequences based on the tokens. Subsequently, in Step S436, the generation module 330 substitutes the string words corresponding to the tokens into the second token sequences to generate a number of cross-site scripting attack strings.

Specifically, the generation module 330 uses the structure model 350 as an input value to generate the cross-site scripting attack strings. As the structure model 350 is a possible sequence combination of the tokens, Node 1 serves as a start point and an end point, the rest points may be passed repetitively, and any path generated by randomly traversing the nodes in FIG. 5 in the direction of the directed edge is a possible token sequence. As the traversal process is based on the structure model 350, a second token sequence same to or different from the first token sequence may be generated. The tokens in the second token sequence are substituted with words corresponding to the cross-site scripting language syntax to form new cross-site scripting attack strings. The same token may correspond to more than one string words. Therefore, cross-site scripting attack strings same to or different from those in the attack string samples may be generated. That is, according to the new second token sequence randomly generated by the structure model 350, new cross-site scripting attack strings may be established. With the five examples of the attack string sample, the scripting attack strings shown below may be respectively obtained:

---

(1) "'>, alert(123)<iframe/src=http://xssed.com>alert(123)</scrihttp://pt>alert(123)

(2) "'>, '></div>alert(123)<input><script>alert(123)</script></marquee>alert(123)">

(3) >"'>, </p>alert(123)<marquee><script>alert(123)</script></title>alert(123)

(4) "/>, </ScRiPt>alert(123)<title><script>alert(123)</script></SCRIPT>alert(123)

(5) >"'>, </form>alert(123)<b><script>alert(123)</script></input>alert(123)" type="hidden" />

---

Further, in Step S440, the generation module 330 outputs the cross-site scripting attack strings to the website under test 50. It should be noted that the cross-site scripting attack strings might have the same token sequences as the attack string samples, but brand new word combinations, or even unprecedented token sequences.

In conclusion, in the method for generating a cross-site scripting attack of the disclosure, the attack string samples are converted into token sequences and the string words corresponding to the tokens are used to replace the tokens, so as to further generate cross-site scripting attack strings. Therefore, the disclosure may generate new and unprecedented cross-site scripting attacks to assist the current cross-site flaw detection technology and enhance the capability of testing unknown flaws of a website.

Although the disclosure is already disclosed above with the embodiments, the embodiments are not used to limit the disclosure. Any persons with ordinary skill in the art may make several variations and modifications without departing from the spirit and scope of the disclosure. Therefore, the protection scope of the disclosure should be as defined by the claims.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for generating a cross-site scripting attack, applicable to an electronic device, comprising:
   receiving a number of attack string samples, wherein each attack string sample includes a number of string words;
   analyzing the attack string samples respectively to obtain a number of first token sequences, wherein each first token sequence includes a number of tokens, and each token corresponds to at least one of the string words;
   generating a number of cross-site scripting attack strings according to the string words corresponding to the tokens and the first token sequences, comprising:
   establishing a structure model according to the first token sequences;
   generating a number of second token sequences by using the tokens according to the structure model; and
   substituting the string words corresponding to the tokens into the second token sequences to generate the cross-site scripting attack strings; and
   outputting the cross-site scripting attack strings.

2. The method for generating a cross-site scripting attack according to claim 1, wherein the step of analyzing the attack string samples respectively to obtain the first token sequences comprises:
   analyzing the attack string samples to obtain the first token sequences based on a cross-site scripting language syntax corresponding to the string words.

3. The method for generating a cross-site scripting attack according to claim 1, wherein the second token sequences are randomly generated according to the structure model.

4. The method for generating a cross-site scripting attack according to claim 1, wherein the structure model is established according to the Bayes' theorem, Markov Chain (MC) or Hidden Markov Model (HMM).

5. The method for generating a cross-site scripting attack according to claim 1, wherein the structure model is represented by a directed graph to decide an order of the tokens in the second token sequences.

6. The method for generating a cross-site scripting attack according to claim 1, wherein the structure model is converted through probability and automata technologies.

7. The method for generating a cross-site scripting attack according to claim 1, wherein the string words corresponding to the tokens are obtained through random substitution into the second token sequences according to cross-site scripting language syntax.

* * * * *